US010213976B2

(12) United States Patent
Portinari et al.

(10) Patent No.: US 10,213,976 B2
(45) Date of Patent: Feb. 26, 2019

(54) PROCESS AND PLANT FOR BUILDING TYRES FOR VEHICLE WHEELS

(71) Applicant: Pirelli Tyre S.p.A., Milan (IT)

(72) Inventors: Gianni Portinari, Milan (IT); Davide Conti, Milan (IT); Ignazio De Gese, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 309 days.

(21) Appl. No.: 14/726,018

(22) Filed: May 29, 2015

(65) Prior Publication Data

US 2015/0290889 A1 Oct. 15, 2015

Related U.S. Application Data

(62) Division of application No. 14/366,529, filed as application No. PCT/IB2012/057506 on Dec. 20, 2012, now Pat. No. 9,073,276.

(Continued)

(30) Foreign Application Priority Data

Dec. 23, 2011 (IT) .............................. MI2011A2370

(51) Int. Cl.
*B29D 30/26* (2006.01)
*B29D 30/24* (2006.01)
(Continued)

(52) U.S. Cl.
CPC ......... *B29D 30/245* (2013.01); *B29D 30/005* (2013.01); *B29D 30/242* (2013.01);
(Continued)

(58) Field of Classification Search
CPC .. B29D 30/0016; B29D 30/005; B29D 30/20; B29D 30/246; B29D 30/247;
(Continued)

(56) References Cited

U.S. PATENT DOCUMENTS 2,818,907 A 1/1958 Sapp
2007/0187018 A1* 8/2007 Lacagnina ............. B29D 30/20
156/111

(Continued)

FOREIGN PATENT DOCUMENTS

CN 101484302 7/2009
CN 101522403 9/2009
(Continued)

OTHER PUBLICATIONS

Decision on Grant dated Nov. 15, 2016 by the Federal Service for Intellectual Property in corresponding Application No. 2014130279/05(048735) (15 pages).

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

Method, process and plant for building tires for vehicle wheels wherein: in a service position of a carcass structure building line, a forming drum is associated with a pair of support elements including a first support element and a second support element; the forming drum is moved, associated with the pair of support elements, in a deposition line in the carcass structure building line; and the forming drum is transferred from the deposition line to a subsequent work station of the carcass structure building line. The transfer from the deposition line to the subsequent work station includes dissociating the forming drum from the second support element, keeping the forming drum associated with the first support element; transferring the forming drum, associated with the first support element and dissociated from the second support element, to the subsequent work station; dissociating, in the subsequent work station, the first support element from the forming drum, leaving the forming drum in the subsequent work station; and transferring the (Continued)

first support element, dissociated from the forming drum, into the service position.

18 Claims, 6 Drawing Sheets

Related U.S. Application Data

(60) Provisional application No. 61/580,948, filed on Dec. 28, 2011.

(51) Int. Cl.
*B29D 30/00* (2006.01)
*B29D 30/32* (2006.01)
*B29D 30/20* (2006.01)

(52) U.S. Cl.
CPC ...... *B29D 30/26* (2013.01); *B29D 2030/0055* (2013.01); *B29D 2030/202* (2013.01); *B29D 2030/204* (2013.01); *B29D 2030/2664* (2013.01); *B29D 2030/3278* (2013.01)

(58) Field of Classification Search
CPC .......... B29D 30/32; B29D 2030/0032; B29D 2030/202; B29D 2030/204; B29D 2030/3278; B29D 2030/2664
See application file for complete search history.

(56) References Cited

U.S. PATENT DOCUMENTS

| 2011/0232831 A1* | 9/2011 | Marchini ............ B29D 30/245 156/117 |
| 2011/0290403 A1 | 12/2011 | D'Ambrosio et al. |
| 2012/0138213 A1 | 6/2012 | Marchini et al. |

FOREIGN PATENT DOCUMENTS

| DE | 10 2007 031 091 | 1/2009 |
| RU | 1610741 | 10/1994 |
| WO | WO 2008/099236 A1 | 8/2008 |
| WO | WO 2010/070374 A1 | 6/2010 |
| WO | WO 2011/018687 A1 | 2/2011 |

OTHER PUBLICATIONS

English-language translation of Decision on Grant dated Nov. 15, 2016 by the Federal Service for Intellectual Property in corresponding Application No. 2014130279/05(048735) (9 pages).
Notification of the First Office Action from the State Intellectual Property Office of the People's Republic of China, in counterpart Chinese Application No. 201280068343.0 dated Oct. 30, 2015.
International Search Report from the European Patent Office for International Application No. PCT/IB2012/057506, dated Apr. 19, 2013.
Written Opinion of the International Searching Authority from the European Patent Office for International Application PCT/IB2012/057506, dated Apr. 19, 2013.

* cited by examiner

PROCESS AND PLANT FOR BUILDING TYRES FOR VEHICLE WHEELS

CROSS REFERENCE TO RELATED APPLICATIONS

This application is a divisional of U.S. application Ser. No. 14/366,529, filed Jun. 18, 2014, which is a national phase application based on PCT/IB2012/057506, filed Dec. 20, 2012, which claims the priority of Italian Patent Application No. MI2011A002370, filed Dec. 23, 2011, and the benefit of U.S. Provisional Application No. 61/580,948, filed Dec. 28, 2011, the content and subject matter of each application being incorporated herein by reference.

BACKGROUND OF THE INVENTION

Field of the Invention

The present invention relates to a process and plant for building tyres for vehicle wheels.

In particular, the present invention relates to a method for managing a carcass structure building line for tyres of vehicle wheels, and a process and plant for building tyres for vehicle wheels for carrying out such a method.

Description of the Related Art

Tyre production cycles provide that, after a building process in which the various structural components of the tyre itself are made and/or assembled in one or more building lines, a moulding and vulcanization process, suitable for defining the tyre structure according a desired geometry and tread pattern, is carried out in a suitable vulcanization line.

A tyre for vehicle wheels typically comprises a carcass structure, shaped according to a substantially toroidal configuration, comprising at least one carcass ply having respectively opposite end portions. The latter are engaged with respective anchoring annular structures, generally called "bead cores". The anchoring annular structures are arranged in regions usually identified with the term "beads". The beads have an inner diameter substantially corresponding to a so-called "fitting diameter" of the tyre on a respective mounting rim. The tyre also comprises a crown structure comprising at least one belt strip arranged in a radially outer position to the carcass ply with reference to the centre of the tyre and a tread band in a radially outer position to the belt strip. Typically, on the tread band, longitudinal and transverse grooves are formed, arranged so as to define a desired tread pattern. Between the tread band and the belt strip(s) a so-called "underlayer" of elastomeric material can be interposed, having features suitable for ensuring a stable connection of the belt strip(s) with the tread band itself. The tyre further comprises a pair of so-called sidewalls of elastomeric material applied on opposite sides onto the lateral surfaces of the carcass structure. In tyres of the "tubeless" type, a layer of eiastomeric material, usually called "liner", having air-tightness features and extending from one bead to the other, is present in a radially inner position relative to the carcass ply.

By "elastomeric material" it is meant a composition comprising at least one elastomeric polymer and at least one reinforcing filler. Preferably, such composition further comprises additives, such as a cross-linking agent and/or a plasticizer. Thanks to the presence of the cross-linking agent, such material may be cross-linked by heating, so as to form the final manufactured article.

By "structural component" of the tyre it is meant any part of the tyre, or portion thereof, suitable for carrying out a function. Therefore, structural component are, for example: liner, under-liner, anti-abrasion inserts, bead core, fillers in the bead region, carcass ply/plies, belt strip(s), belt underlayer, tread band under-layer, sidewalls, sidewall inserts, tread band, textile or metallic reinforcements, reinforcing elements made of elastomeric material, etc.

By "stable association" or "stably associated" it is meant an association that lasts during the various steps of a tyre building process.

By "stable coupling" or "stably coupled" it is meant a coupling that lasts during the various steps of a tyre building process.

WO 2008/099236 to the same Applicant describes an apparatus for building tyres comprising a forming drum and auxiliary support elements. The auxiliary support elements are moved close to the forming drum for facilitating supply steps of elementary components in axially outer regions of the forming drum. After the carcass ply has been formed, the auxiliary support elements are moved away from the forming drum so as to be able to carry out a flap formation step wherein the ends of the carcass ply are folded so as to form flaps that contain the anchoring annular structures.

WO 2011/018687 to the same Applicant describes a plant for building tyres for vehicle wheels, comprising a carcass structure building line, which in turn comprises:
- at least one forming drum;
- at least one pair of support rings removably associable with the forming drum;
- at least one support rings associating station including at least one device for associating the pair of support rings to the forming drum;
- at least one support rings removing station including at least one device for removing the pair of support rings from the forming drum;
- a first transfer device suitable for transferring the forming drum dissociated from the pair of support rings from the support rings removing station to a work station of the carcass structure building line;
- a second transfer device suitable for transferring the pair of support rings dissociated form the forming drum to a support rings temporary storage.

The Applicant has verified that, in the carcass structure building line of the type described by WO 2011/018687, employing forming drums and auxiliary support rings or elements, managing the transfers of the forming drums and of the support elements together with managing the association/removal of the support elements with/from the respective forming drum may be complicated, can make the building times longer, can require a significant amount of resources and can increase the sizes of the carcass structure building line.

In particular, the Applicant notes the such drawbacks may be proportionally more relevant when building processes are adopted which employ semifinished products made in advance and stored in respective storages.

In this case the Applicant observes that, being possible to make more compact building plants, the management of the support elements could considerably affect the plant layout, production and flexibility.

SUMMARY OF THE INVENTION

The Applicant aims at simplifying the management of the transfers of forming drums and support elements and at simplifying the management of the association/dissociation of the support elements with/from the respective forming drum. Moreover, the Applicant aims at reducing the sizes of the carcass structure building line and at optimizing time and resources being employed.

The Applicant has perceived that the above-mentioned objects can be achieved by means of a method wherein at least one forming drum and a pair of support elements are provided in a carcass structure building line, managing the two support elements independently from each other.

In particular, the Applicant has found that by providing that the two support elements are associated/dissociated from the forming drum and moved inside the carcass structure building line according to modalities different from one another it is possible to simplify the building plant itself thanks to a more efficient management of the movements of the forming drums and of the support elements themselves.

According to a first aspect thereof, the invention thus relates to method for managing a carcass structure building line for tyres of vehicle wheels, comprising at least one of the of the following activities: associating a pair of support elements comprising a first support element and a second support element with a forming drum in a service position of the carcass structure building line; moving the first support element inside the carcass structure building line according to a first, a second and a third movement.

In the first movement, the first support element is moved in a deposition line associated, together with the second support element, with said forming drum for building at least one structural component of the carcass structure of a tyre being processed.

In the second movement the first support element is transferred, associated with said forming drum, to a subsequent work station in which at least one further structural component of the carcass structure is built with the forming drum dissociated from the pair of support elements.

In the third movement the first support element is transferred, dissociated from said forming drum, from said subsequent work station to the service position.

Preferably, the second support element is dissociated from the forming drum while the first support element is moved according to the second and third movement.

The Applicant believes that this managing method avoids the need to use, in the carcass structure building line, temporary storages for support elements, special support elements associating/dissociating stations and special devices for transferring the support elements dissociated form the forming drum. This advantageously allows the structure and operation of the carcass structure building line to be simplified, the sizes of the same to be reduced and the time and resources employed to be optimized.

According to a second aspect thereof, the invention relates to process for building tyres for vehicle wheels comprising building a carcass structure of a tyre, wherein said building the carcass structure comprises at least one of the following activities:

a) associating, in a service position of a carcass structure building line, a forming drum with a pair of support elements comprising a first support element and a second support element;
b) moving said forming drum, associated with said pair of support elements, in a deposition line comprised in the carcass structure building line;
c) building, in said deposition line, at least one structural component of the carcass structure of the tyre being processed on the forming drum associated with said pair of support elements;
d) transferring the forming drum from the deposition line to a subsequent work station of the carcass structure building line;
e) building, in said subsequent work station, at least one further structural component of the carcass structure of the tyre being processed on the forming drum dissociated from the pair of support elements.

The activity d) comprises at least one of the following actions:
dissociating the forming drum from the second support element, keeping the forming drum associated with the first support element;
transferring the forming drum, associated with the first support element and dissociated from the second support element, to the subsequent work station;
dissociating, in the subsequent work station, the first support element from the forming drum, leaving the forming drum in the subsequent work station;
transferring the first support element, dissociated from the forming drum, into the service position.

According to a third aspect thereof, the invention relates to a plant for building tyres for vehicle wheels comprising a carcass structure building line, which in turn comprises:
at least one forming drum;
a pair of support elements comprising a first support element and a second support element removably associable with said at least one forming drum;
a service position;
a deposition line to build at least one structural component of the carcass structure of a tyre being processed.

Preferably, the deposition line comprises a moving device configured to transfer said at least one forming drum between the service position and the deposition line and to move said at least one forming drum within the deposition line;

Preferably, said plant comprises a subsequent work station to the deposition line.

Preferably, said plant comprises a transfer device configured to move said at least one forming drum between the service position and the subsequent work station.

Preferably, the second support element is stably associated with said moving device of the deposition line and the first support element is movable between a first operating position in which it is removably associated, together with said at least one forming drum and the second support element, with said moving device of the deposition line, and a second operating position in which the first support element is removably associated with said transfer device.

The present invention, in at least one of the above-mentioned aspects, may have at least one of the following preferred features.

Preferably, the first support element and the second support element are associated with said forming drum in axially opposite positions.

Preferably, after the transfer from the subsequent work station to the service position, the first support element is associated in said service position, together with the second support element, with another forming drum of the carcass structure building line or once again with said forming drum, once the building of the carcass structure of the tyre being processed on it has ended.

Preferably, after the association, together with the second support element, with said other forming drum or with said forming drum, the first support element is moved again inside the carcass structure building line according to the first, second and third movement, to build the carcass structure of another tyre.

In a preferred embodiment, the managing method comprises keeping the second support element stably coupled with a moving device of said deposition line during the first, second and third movement of the first support element.

In a preferred embodiment, the activity of associating the first and the second support element with said forming drum in the service position comprises removably coupling the first support element, together with said forming drum, with the moving device of said deposition line with which the second support element is stably coupled.

Preferably, the first movement comprises transferring the first support element, associated with said forming drum and with the 10 second support element, from the service position to the deposition line.

In a preferred embodiment, in the first movement the transfer from the service position to the deposition line is carried out by the moving device of said deposition line.

Preferably, the first movement comprises transferring the first support element, associated with said forming drum and with the second support element, from the deposition line to the service position.

In a preferred embodiment, in the first movement the transfer from the deposition line to the service position is carried out by the moving device of said deposition line.

Preferably, the second movement comprises dissociating, in said service position, the first support element and the forming drum from the second support element, keeping the first support element associated with the forming drum. Advantageously, the second support element is left associated with the moving device of said deposition line.

In a preferred embodiment, the dissociation in said second movement is carried out by removably coupling the first support element, associated with said forming drum, with a transfer device.

Preferably, the second movement comprises transferring the first support element, associated with said forming drum and dissociated from the second support element, from the service position to the subsequent work station.

In a preferred embodiment, in the second movement the transfer from the service position to the subsequent work station is carried out by the transfer device.

In a preferred embodiment, in the third movement the transfer of the first support element from the subsequent work station to the service position is carried out by the transfer device.

Preferably, the third movement comprises dissociating, in the subsequent work station, the first support element from the forming drum, leaving the forming drum in the subsequent work station.

In a preferred embodiment, the dissociation in said third movement is carried out by decoupling the forming drum from the first support element, leaving the first support element coupled with the transfer device and said forming drum associated with the subsequent work station.

Advantageously, the first, second and third movement are carried out one after the other.

Advantageously, the first, second and third movement are carried out after associating the first and second support element with the forming drum.

In the activity a) of the building process, the first support element and the second support element advantageously are associated with said forming drum in axially opposite positions.

Preferably, the activity b) of the building process comprises transferring said forming drum, associated with said pair of support elements during the activity a), from said service position to the deposition line.

In a preferred embodiment, the activity d) comprises:
transferring the forming drum, associated with the pair of support elements, from the deposition line to the service position,
dissociating, in said service position, the forming drum from the second support element, keeping the forming drum associated with the first support element, and
transferring the forming drum, associated with the first support element and dissociated from the second support element, from the service position to the subsequent work station.

In a preferred embodiment, the activity of dissociating the forming drum from the second support element comprises the activity of leaving the second support element coupled with a moving device of the deposition line.

Advantageously, the activity c) comprises building at least one of the following structural components: bead reinforcing fabric, at least one portion of an anti-abrasion element, liner, pub-liner, layer of self-sealing material, at least one first carcass ply, internal reinforcements associated with said first carcass ply, intermediate elements arranged between said first carcass ply and said internal reinforcements, sidewall inserts, under-belt inserts.

Advantageously, the activity e) comprises positioning at least one pair of anchoring annular structures at axially opposite ends of at least one carcass ply of the carcass structure of the tyre being processed.

Advantageously, the activity e) comprises folding the ends of said at least one carcass ply on said at least one carcass ply so as to form flaps that contain said at least one pair of anchoring annular structures.

In an embodiment, after carrying out the activity e), it is provided to transfer the forming drum from the subsequent work station to an unloading station.

In another embodiment, after carrying out the activity e), it is provided to transfer the forming drum from the subsequent work station to a further subsequent work station.

Advantageously, it is provided to build, in said further subsequent work station, at least one further structural component of the carcass structure of the tyre being processed on the forming drum dissociated from the pair of support elements. Preferably, the forming drum is transferred from the further subsequent work station to an unloading station.

Advantageously, building in said further subsequent work station comprises at least one of the following activities:
applying at least one portion of an anti-abrasion element;
applying at least one portion of sidewalls of the tyre being processed;
rolling of flaps containing anchoring annular structures.

Activities a) to e) are preferably repeated with a further forming drum of the carcass structure building line or with said forming drum, once the building of the carcass structure of the tyre being processed on it has ended, for building the carcass structure of another tyre.

Advantageously, it is provided to build a crown structure in at least one crown structure building line comprising at least one work station, said crown structure comprising at least one belt structure.

Advantageously, it is provided to toroidally shape the carcass structure by assembling it with said crown structure in at least one shaping and assembly station of the tyre being processed.

Preferably, the first support element is in the first operating position during the transfer of said at least one forming drum between the service position and the deposition line.

Preferably, the first support element is in the first operating position during the movement of said at least one forming drum inside the deposition line.

Preferably, the first support element is in the second operating position, removably associated with said transfer device together with said at least one forming drum, during the transfer of said at least one forming drum from the service position to the subsequent work station.

Preferably, the first support element is in the second operating position, removably associated with said transfer device and dissociated from said at least one forming drum, during the return from the subsequent work station to the service position.

Preferably, the moving device of the deposition line comprises a holding mechanism of the second support element.

Preferably, the moving device of the deposition line comprises a coupling/decoupling mechanism with/from said at least one forming drum.

In a preferred embodiment, the moving device of the deposition line is a shuttle.

In a preferred embodiment, the transfer device comprises a robotized arm.

Preferably, the transfer device comprises a coupling/decoupling mechanism with/from the first support element.

Preferably, the transfer device comprises a coupling/decoupling mechanism with/from said at least one forming drum.

Preferably, the transfer device is configured to move, at said service position, the first support element from the first operating position to the second operating position.

Preferably, the transfer device is configured to removably couple the first support element and said at last one forming drum with the transfer device, decoupling them from the moving device of said deposition line.

Preferably, the transfer device is configured to leave the second support element coupled with the moving device of the deposition line.

Preferably, the transfer device is configured to transfer said at least one forming drum, associated with the first support element and dissociated from the second support element, from said service position to said subsequent work station.

Preferably, the transfer device is configured to decouple the first support element from the forming drum.

More preferably, by means of the transfer device, the first support element is decoupled from the forming drum in the subsequent work station.

Even more preferably, the forming drum is left in the subsequent work station while the first support element remains associated with the transfer device.

Preferably, the transfer device is configured to transfer the first support element, dissociated from said at least one forming drum, from the subsequent work station to the service position.

Preferably, the transfer device is configured to enable, at said service position, the movement of the first support element from the second operating position to the first operating position.

More preferably, the movement of the first support element from the second operating position to the first operating position is carried out by said transfer device by releasing the first support element and said at least one forming drum to said moving device of said deposition line with which the second support element is stably associated.

In a preferred embodiment, the subsequent work station comprises a moving device for moving said at least one forming drum within the subsequent work station.

Preferably, said transfer device is configured to release said at least one forming drum to the moving device of the subsequent work station, keeping the first support element coupled with the transfer device.

Preferably, the carcass structure building line comprises n work stations, with n being an integer at least equal to 2, at least one of which is inside the deposition line and one is the subsequent work station.

Preferably, the carcass structure building line comprises n work stations, with n being an integer at least equal to 3, at least one of which is inside the deposition line, one is the subsequent work station and one is an unloading station.

Preferably, the carcass structure building line comprises n work stations, with n being an integer at least equal, to 4, at least one of which is inside the deposition line, one is the subsequent work station, one is a further subsequent work station and one is an unloading station.

Preferably, the deposition line comprises m work stations with m being an integer greater than or equal to one.

Preferably, the carcass structure building line comprises at most n-m forming drums.

Preferably, along the deposition line a single forming drum is moved at a time.

Preferably, the m work stations of the deposition line are configured for building at least one of the following structural components: bead reinforcing fabric, at least one portion of an anti-abrasion element, liner, sub-liner, layer of self-sealing material, at least one first carcass ply, internal reinforcements associated with said first carcass ply, intermediate elements arranged between said first carcass ply and said internal reinforcements, sidewall inserts, under-belt inserts.

Preferably, the subsequent work station is a station of anchoring annular structures application and flap formation.

Preferably, the further subsequent work station is at least one from: a station for applying at least one portion of an anti-abrasion element; a station for applying at least one portion of sidewalls; a station for rolling flaps containing anchoring annular structures.

Advantageously, the carcass structure building line is without a temporary storage for the pair of support elements.

Preferably, during steady state operation, the pair of support elements is the only one inside the carcass structure building line.

Preferably, the plant comprises at least one crown structure building line comprising at least one work station, each crown structure comprising at least one belt structure.

Preferably, the plant comprises at least one shaping and assembly station adapted to shape the carcass structure of the tyre being processed, assembling it to the crown structure of the tyre being processed.

BRIEF DESCRIPTION OF THE DRAWINGS

Further features and advantages of the present invention will appear more clearly from the following detailed description of some illustrative embodiments thereof, provided only as non-limiting examples, which description will be made with reference to the attached drawings, wherein.

DETAILED DESCRIPTION OF THE INVENTION

Figure 1:
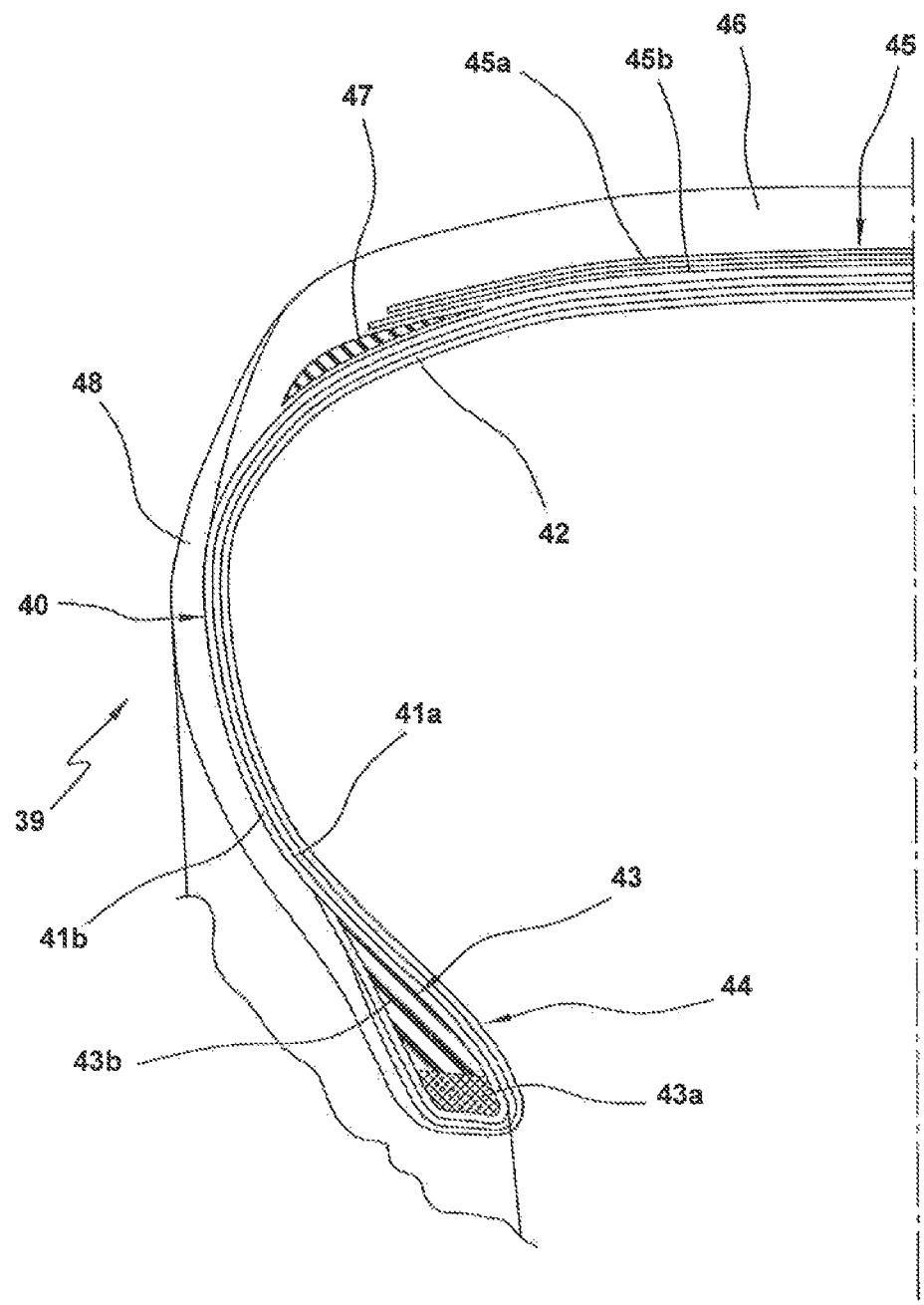
FIG. 1 shows a radial semi-section of a tyre for vehicle wheels which can be built according to the invention.

FIG. 1 shows an example of a tyre 39 which can be built according to the present invention.

The tyre 39 essentially comprises a carcass structure 40 shaped according to a substantially toroidal configuration and having at least one carcass ply 41a and/or 41b. A layer of elastomeric airtight material or so-called liner 42 is applied in a radially inner position, relative to the centre of the tyre, onto the carcass ply/plies 41a, 41b. Two anchoring annular structures 43, each comprising a so-called bead core 43a carrying an elastomeric filler 43b, are engaged with respective end portions of the carcass ply/plies 41a and/or 41b. The anchoring annular structures 43 are positioned close to regions usually identified as "beads" 44, at which engagement between tyre 39 and a respective mounting rim (not shown) usually takes place. A belt structure 45, comprising several belt strips 45a, 45b, is circumferentially applied around the carcass ply/plies 41a and/or 41b, in a radially outer position relative to them, and a tread band 46 is circumferentially superimposed to the belt structure 45, in a radially outer position relative to it.

So-called "under-belt inserts" 47 can be associated with the belt structure 45, each arranged between the carcass ply/plies 41a and/or 41b and one of the axially opposite end edges of the belt structure 45. Two sidewalls 48, each extending from the respective bead 44 to a corresponding lateral edge of the tread band 46, are applied in laterally opposite positions onto the carcass ply/plies 41a and/or 41b.

Figure 2:
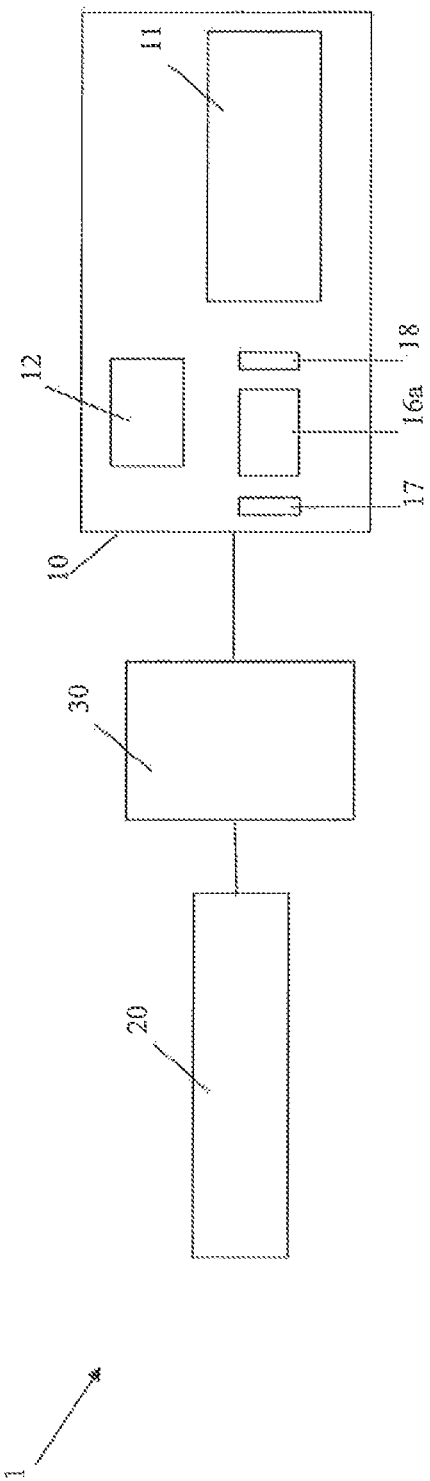
FIG. 2 schematically shows a plant for building tyres for vehicle wheels according to the invention.

FIG. 2 shows a building plant 1 according to the invention comprising a carcass structure building line 10, a crown structure building line 20 and a shaping and assembly station 30.

The carcass structure building line 10 is adapted to form, on a forming drum, a carcass structure 40 comprising the carcass ply/plies 41a and/or 41b, the liner 42, the anchoring annular structures 43, the under-belt inserts 47 (preferably coupled as a semifinished product with the radially outer carcass ply) and possibly at least a part of the sidewalls 48.

At the same time, the crown structure building line 20 is adapted to form, on another forming drum, a crown structure comprising at least the belt structure 45, the tread band 46, and possibly at least a part of the sidewalls 48.

In the shaping and assembly station 30 the carcass structure 40, formed in the carcass structure building line 10 and fitted on a suitable shaping drum (not shown), is shaped and assembled with the crown structure, formed in the crown structure building line 20.

Downstream of the shaping and assembly station 30, the plant 1 also comprises at least one moulding and vulcanization unit, not shown.

The crown structure building line 20, the shaping and assembly station 30 and the moulding and vulcanization unit are made according to techniques common in the art.

The carcass structure building line 10 comprises a deposition line 11, at least one subsequent work station 12, at least one forming drum 16a and a pair of auxiliary support elements 17, 18.

Preferably, the carcass structure building line 10 comprises n work stations (with n being an integer at least equal to 2) of which m work stations (with m being an integer greater than 1) belong to the deposition line 11.

For example,
n can be greater than or equal to 6;
n can be less than or equal to 13;
m can be greater than or equal to 2;
m can be less than or equal to 10.

The m work stations of the deposition line 11 are configured for building at least one of the following structural components of a tyre: bead reinforcing fabric, a portion of an anti-abrasion element, liner, sub-liner, layer of self-sealing material, carcass ply/plies, internal reinforcements associated with the carcass ply/plies, intermediate elements arranged between the first carcass ply and the internal reinforcements, the sidewall inserts, the under-belt inserts.

In the deposition line 11 the structural elements of the tyre are advantageously built by depositing semifinished products on the forming drum 16a.

By "semifinished product" it is meant an elongate element fed on the forming drum 16a to form a component of the tyre.

The semifinished product is preferably defined by strip-shaped continuous elongate element. Preferably, the semifinished product is cut to measure and has a flat cross section.

The semifinished product is made of elastomeric material. Preferably, it incorporates one or more reinforcing textile or metallic cords. Such reinforcing textile or metallic cords are preferably arranged parallel to one another either in the longitudinal direction of the elongate element itself or inclined relative to said longitudinal direction.

In the m work stations of the deposition line 11, the continuous elongate element is preferably fed in a circumferential direction onto the forming drum 16a, for example from a reel or an extruder.

In the deposition line 11, the deposition of semifinished products on the forming drum 16a is carried out with the aid of two support elements 17, 18.

The two support elements 17, 18 are removably associable with the forming drum 16a in axially opposite positions. The two support elements 17, 18 preferably are two annular elements having an outer diameter substantially equal to the outer diameter of the forming drum 16a.

Preferably, along the deposition line 11 a single forming drum is moved at a time and the carcass structure building line 10 comprises n-m forming drums at most. Furthermore, the carcass structure building line 10 comprises, during the steady state operation, a single pair of support elements 17, 18 movable between at least two work stations. These features advantageously allow the dimensions of the carcass structure building line 10 to be reduced and the layout thereof to be simplified.

Figure 3:
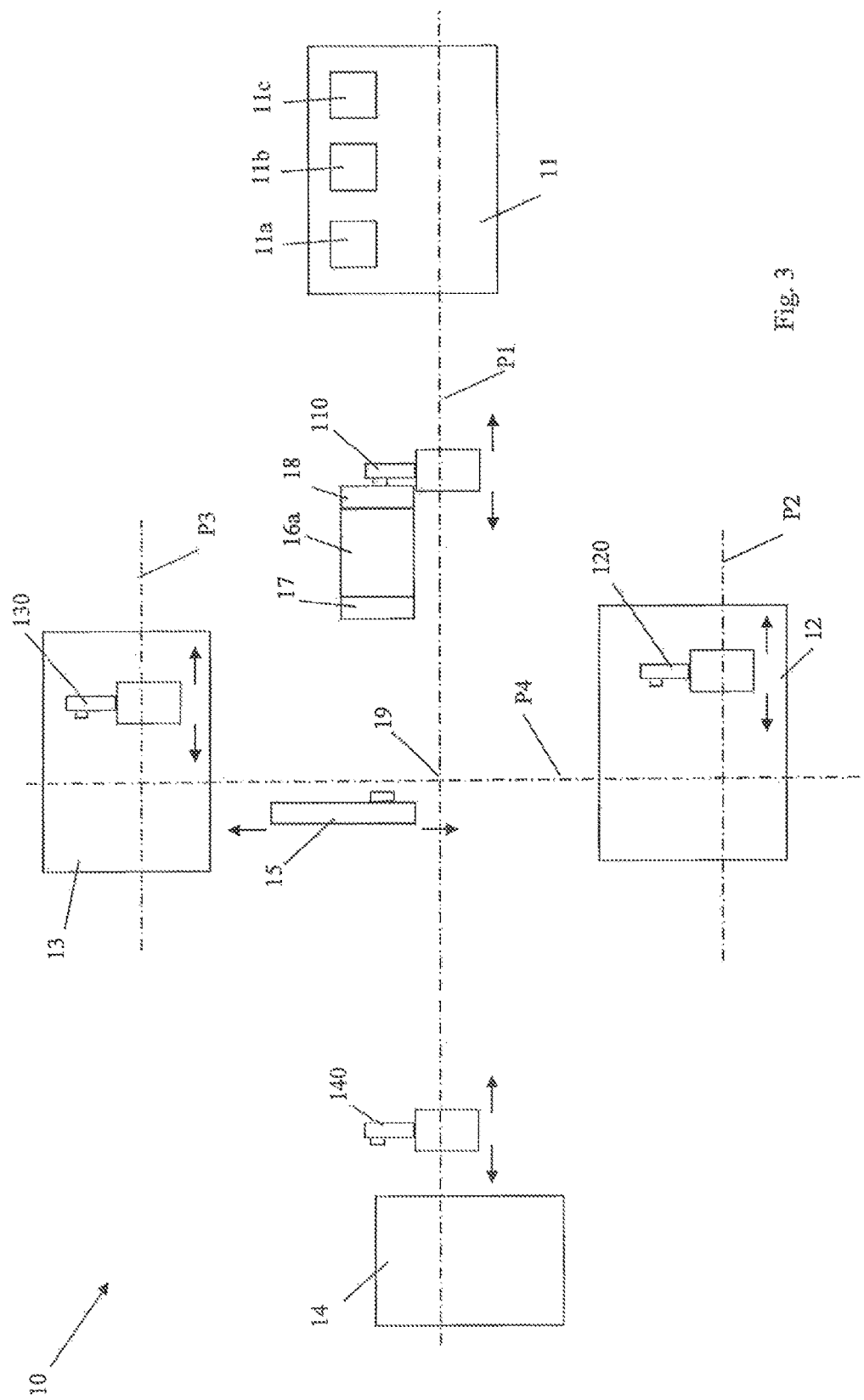
FIG. 3 schematically shows an embodiment of a carcass structure building line of the plant of FIG. 2 comprising a forming drum, wherein the first support element is in a first operating position.
Figure 4:
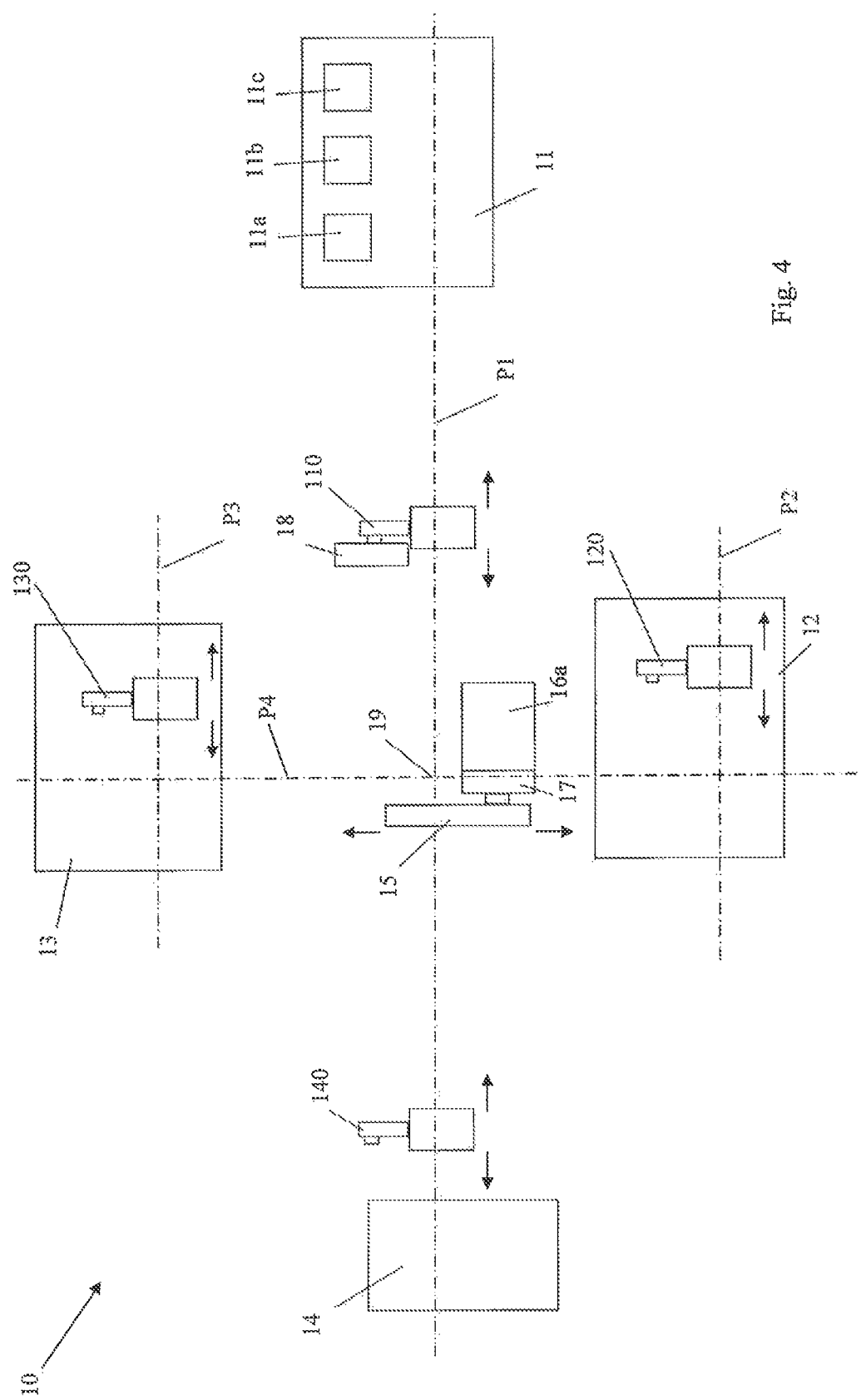
FIG. 4 schematically shows the embodiment of FIG. 3 wherein the first support element is in a second operating position during a movement from a service position to a subsequent work station.
Figure 5:
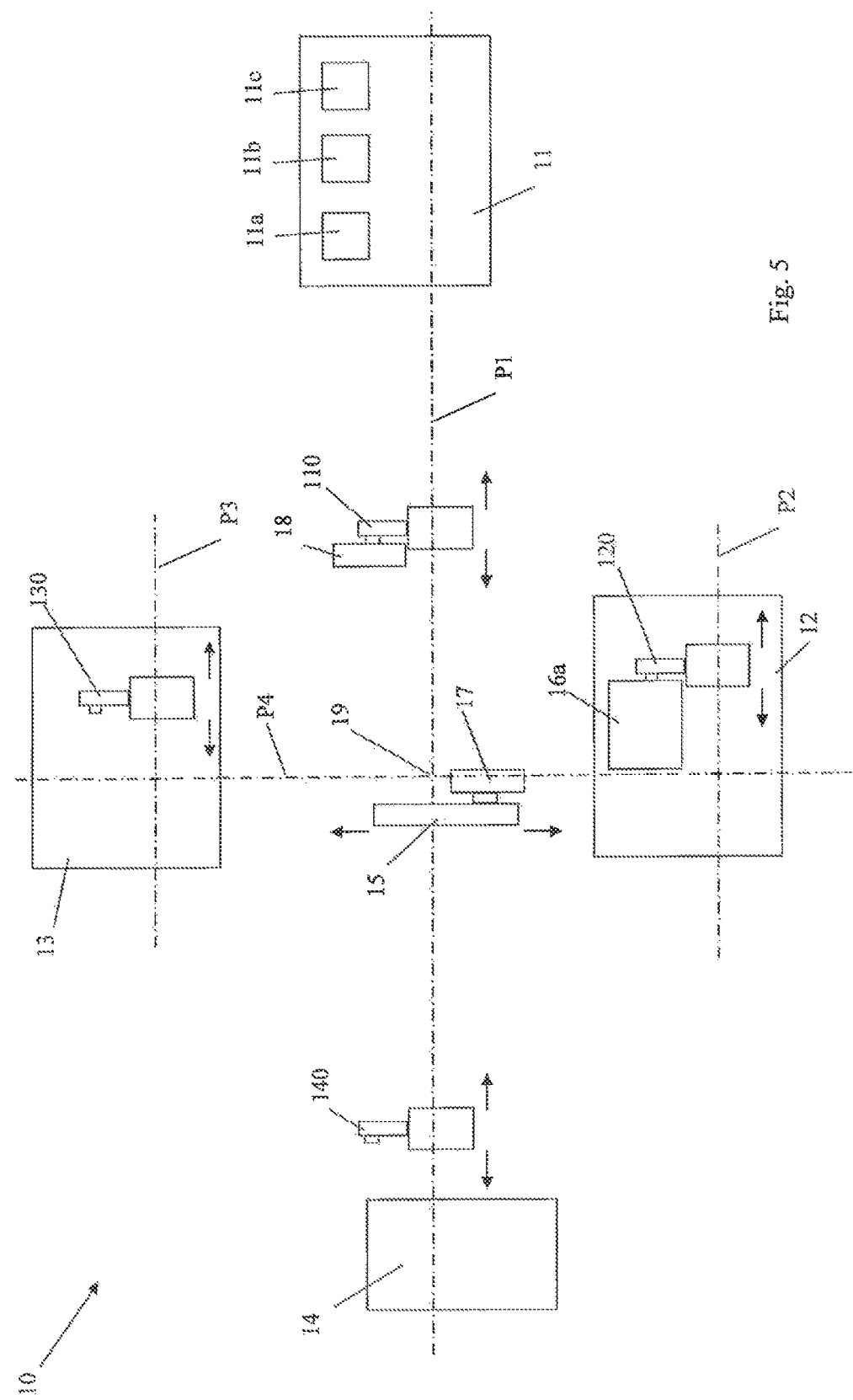
FIG. 5 schematically shows the embodiment of FIG. 3 wherein the first support element is in the second operating position during a movement from the work station to the subsequent service position.

FIGS. 3-5 show an embodiment of a carcass structure building line 10 comprising a deposition line 11 comprising 3 work stations 11a, 11b and 11c, a subsequent workstation 12 of anchoring annular structures 43 application and flap formation, a further subsequent work station 13 for rolling operations and an unloading station 14 (i.e. n=6 and m=3).

In the embodiment shown in FIGS. 3-5, the carcass structure building line 10 comprises a forming drum 16a and a single pair of support elements, comprising a first support element 17 and a second support element 18.

The carcass structure building line 10 also comprises a first moving device 110 associated with the deposition line 11, a second moving device 120 associated with the subsequent work station 12, a third moving device 130 associated with the further subsequent work station 13, a fourth moving device 140 associated with the unloading station 14 and a transfer device 15. The moving devices 110, 120, 130, 140 and the transfer device 15 are adapted to move the forming drum 16a inside the work stations 12, 13, 14 and the deposition line 11 and between one work station and the other.

In the embodiment shown, the moving devices 110, 120, 130, 140 are shuttles which can move, actuated by a suitable motor (not shown), on proper guides (not shown) in two opposite directions of motion (indicated by two arrows in the Figures), along paths indicatively represented with P1, P2, P3 in the figure.

Furthermore, the transfer device 15 preferably comprises a robotized arm which moves, for example hanging from a superelevated support point and moved from above, along a path P4 which is perpendicular to the paths P1, P2, P3 and crosses the path P1 at a service position 19.

The moving devices 110, 130 are adapted to make the forming drum 16a to rotate about a rotation axis coinciding with the longitudinal symmetry axis of the drum itself and with the rotation axis of the tyre being formed.

The moving devices 110, 120, 130, 140 and the transfer device are adapted to support one forming drum at a time. In the embodiment shown, the moving devices 110, 120, 130, 140 and the transfer device 15 are adapted to carry the forming drum 16a cantilivered and comprise a coupling/decoupling mechanism able to hold or release a terminal end of a central shaft of the forming drum 16a.

The moving device 110 of the deposition line 11 also comprises a mechanism able to hold the second support element 18 stably coupled with the moving device 110. Preferably, the above-mentioned mechanism able to hold the second support element 18 is provided with a quick connection/disconnection device to speed up the set-up operations in the carcass structure building line 10, as mentioned hereinafter.

The second support element 18 is stably coupled with the moving device 110 during the various building activities in the n work stations of the carcass structure building line 10. This includes the possibility that the second support element 18 is removably associated with the moving device 110 so as to allow replacement with a different support element when, for example, during the set-up operations in the carcass structure building line 10 it is desired to build a carcass structure having structural features (e.g. a different diameter) different from those of the previous one.

The transfer device 15 also comprises a coupling/decoupling mechanism able to hold or release the first support element 17, together with or separately from forming drum 16a.

In the carcass structure building line 10, while the second support element 18 is stably coupled with moving device 110, the first support element 17 is movable between a first operating position and a second operating position. In the first operating position (FIG. 3), the first support element 17 is associated, together with the forming drum 16a and the second support element 18, with the moving device 110 of the deposition line 11. In the second operating configuration (FIGS. 4 and 5), the first support element 17 is associated with the transfer device 15.

As shown in FIG. 3, when the first support element 17 is in the first operating position, it is moved by the moving device 110, together with the forming drum 16a and the second support element 18, from the service position 19 to the deposition line 11 (and vice versa) and inside the deposition line 11, wherein the deposition operations of semifinished products on the forming drum 16a are carried out with the aid of the first support element 17 and the second support element 18.

As shown in FIGS. 4 and 5, when, instead, the first support element 17 is in the second operating position, it is moved by the transfer device 15 from the service position 19 to the subsequent work station 12, associated with the forming drum 16a (see FIG. 4), and from the subsequent work station 12 to the service position 19, dissociated from the forming drum 16a (see FIG. 5).

During the above-mentioned movements of the first support element 17, the second support element 18 remains stably coupled with the moving device 110 (see FIGS. 3 to 5).

In the carcass structure building line 10 the building of a carcass structure 40 is carried out according to the following building process.

In the service position 19, the transfer device 15, associated with the first support element 17, takes the "unloaded" forming drum 16a from the moving device 140 coming from the unloading station 14.

In the service position 39, the transfer device 15 releases the first support element 17 and the forming drum 16a, which are coupled with it, to the moving device 110 of the deposition line 11, with which the second support element 18 is stably coupled.

The forming drum 16a, associated with the first support element 17 and the second support element 18, is thus moved by the moving device 110 in the deposition line 11 for building at least one structural component of the carcass structure 40 of the tyre 39 being processed on the forming drum 16a.

Once the building operations in the deposition line 11 have ended, the moving device 110 transfers the forming drum 16a, associated with the first support element 17 and with the second support element 18, to the service position 19.

In the service position 19, the moving device 110 releases the forming drum 16a, associated with the first support element 17, to the transfer device 15, holding the second support element 18 coupled with the moving device 110.

Subsequently, the transfer device 15 transfers the forming drum 16a, associated with the first support element 17 (and dissociated from the second support element 18), to the subsequent work station 12.

In the subsequent work station 12, the transfer device 15 releases the forming drum to the moving device 120, holding the first support element 17.

Subsequently, the transfer device 15 transfers the first support element 17 to the service position 19.

At the same time, in the subsequent work station 12, at least a pair of anchoring annular structures 43 is positioned at axially opposite ends of at least one carcass ply 41a and/or 41b of the carcass structure 40 of the tyre 39 being processed on the forming drum 16a. After that, the ends of said at least one carcass ply 41a and/or 41b are folded on said at least one carcass ply 41a and/or 41b so as to form flaps containing said at least one pair of anchoring annular structures 43.

Once the building operations in the subsequent work station 12 have ended, the transfer device 15, with which the first support element 17 is coupled, transfers the forming drum 16a to the further subsequent work station 13 for a rolling operation and then delivers, at the service position 19, the forming drum 16a to the moving device 140 holding the first support element 17 coupled with the transfer device 15. The moving device 140 transfers the forming drum 15a to the unloading station 14 for unloading the built carcass structure 40. In particular, by means of the moving device 140 and a transfer, not shown, present in the unloading station 14, the transfer of the carcass structure 40 to the shaping and assembly station 30 takes place for coupling the carcass structure 40, built on the forming drum 16a, with a crown structure, formed in the crown structure building line 20. Once the carcass structure 40 has been unloaded, the moving device 140 takes the "unloaded" forming drum 16a again to the service position 19, where it is associated with the first support element 17 and with the second support element 18 for building the carcass structure 40 of another tyre being processed, in a way totally similar to what explained above.

Although in FIGS. 3-5 a carcass structure building line 10 with a single forming drum 16a is shown, it can advantageously comprise a plurality of forming drums, preferably up to n-m, for building a corresponding plurality of carcass structures 40.

Figure 6:
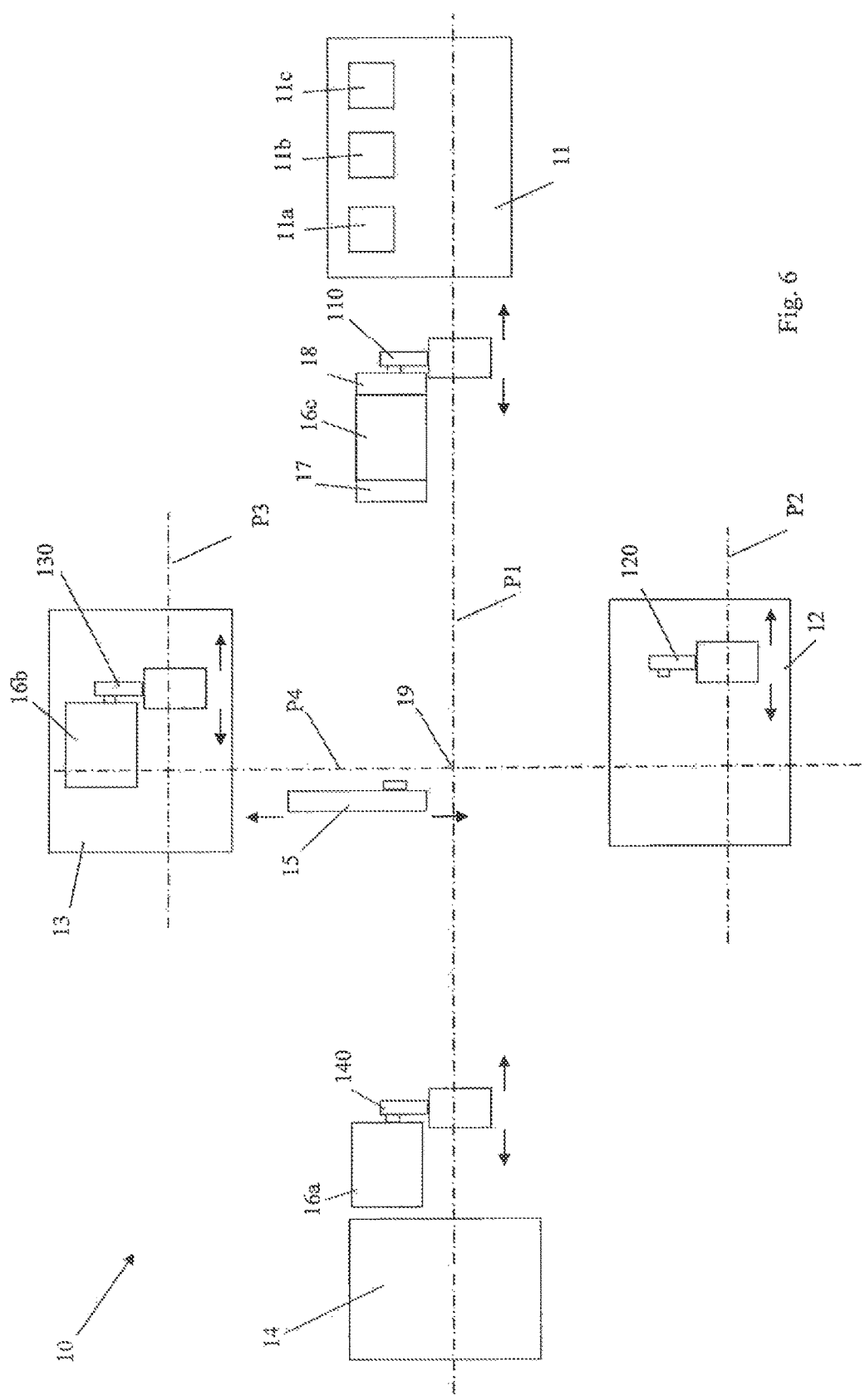
FIG. 6 schematically shows an embodiment of a carcass structure building line of the plant of FIG. 2 comprising three forming drums.

For example, FIG. 6 shows a carcass structure building line 10 totally similar to that shown in FIGS. 3 to 5, except for the fact that it comprises, besides the first forming drum 16a, a second forming drum 16b and a third forming drum 16c (i.e. n-m forming drums with n=6 and m=3).

In this case, the managing method and the building process of the present invention apply in a similar way as described above with reference to a single forming drum 16a.

For example, in a steady state condition, once the building operations on the second forming drum 16b in the deposition line 11 have ended, the moving device 110 transfers the second forming drum 16b, associated with the first support element 17 and with the second support element 18, to the service position 19.

In the service position 19, the moving device 110 releases the second forming drum 16b, associated with the first support element 17, to the transfer device 15, keeping the second support element 18 coupled with the moving device 110.

Subsequently, the transfer device 15 transfers the second forming drum 16b, associated with the first support element 17 (and dissociated from the second support element 18), to the subsequent work station 12, where the second forming drum 16b is released to the moving device 120.

Subsequently, the transfer device 15 transfers the first support element 17 to the service position 19. The moving device 140 transfers the "unloaded" third forming drum 16c to the service position 19, where it is associated with the two support elements 17, 18 and then transferred by the moving device 110 to the deposition line 11.

While the second forming drum 16b is in the subsequent work station 12 and the third forming drum 16c is in the deposition line 11, the first forming drum 16a is transferred by the transfer device 15 from the further work station 13, where it has ended the rolling, to the service position 19, wherein it is delivered to the moving device 140 for unloading the built carcass structure 40.

The second forming drum 16b is transferred by the transfer device 15 from the subsequent work station 12 to the further subsequent work station 13; afterwards, the third forming drum 16c is transferred from the deposition line 11 to the subsequent work station 12 (condition shown in progress in FIG. 6).

Once the carcass structure 40 has been unloaded, the moving device 140 takes the "unloaded" first forming drum 16a again to the service position 19, where it is associated with the two support elements 17, 18 for building the carcass structure 40 of another tyre 39 being processed, in a way totally similar to what explained above.

It is noted that in the embodiments shown, the service position 19 is located in an external position relative to the n work stations, at the crossing between paths P1 and P4. This is related to the arrangement of the work stations 12, 13, 14 and of the deposition line 11 and to the fact that the transfer device 15 and the moving devices 110, 120, 130, 140 move along paths P1, P2, P3, P4 which are straight. However, the service position 19 could be located in a position different from that shown, for example in a case where transfer device 15 and/or at least some of the moving devices 110, 120, 130, 140 are able to move along different (e.g. L-shaped) paths. For example, the service position 19 could be part of the deposition line 11 (e.g. at the beginning of the deposition line 11) or part of one of the n-m work stations external to the deposition line 11.

According to the managing method of the present invention, in the carcass structure building line 10 using a single pair of support elements 17, 18 and one forming drum at a time along the deposition line 11, the association/dissociation of the first support element 17 and of the second support element 18 from the forming drum at the beginning/end of the deposition operations in the deposition line 11 is carried out keeping the second support element 18 stably coupled with the moving device 110 and the first support element associated either with the moving device 110 or with the transfer device 15.

This advantageously allows avoiding the need to use, in the carcass structure building line 10, temporary storages for the support elements, special stations for associating/dissociating the support elements and special devices for transferring the support elements dissociated from the forming drum.

The structure and operation of the carcass structure building line 10 are thus simplified, the dimensions are reduced and the employed time and resources are optimised.

The invention claimed is:

1. A plant for building tyres for vehicle wheels comprising a carcass structure building line, which, in turn comprises:
   at least one forming drum;
   a pair of support elements comprising a first support element and a second support element removably associable with said at least one forming drum in axially opposite positions, the first support element being moveable between a first operating position and a second operating position;
   a service position;
   a deposition line configured to move a single forming drum at a time to build at least one structural component of the carcass structure of a tyre being processed, the deposition line comprising a moving device having a coupling/decoupling mechanism configured to couple/uncouple with a terminal end of a central shaft of the forming drum and a quick connection/disconnection device configured to connect/disconnect with the second support element, wherein the moving device is configured to:

transfer said at least one forming drum between the service position and the deposition line and to transport said at least one forming drum within the deposition line by supporting the at least one forming drum in cantilevered manner while the at least one forming drum is coupled with the first and second support elements;

a subsequent work station to the deposition line; and a transfer device having a coupling/decoupling mechanism configured to couple/uncouple with a terminal end of a central shaft of the forming drum, the transfer device is configured to move said at least one forming drum between the service position and the subsequent work station by supporting the at least one forming drum in cantilevered manner while the at least one forming drum is coupled with only the first support element, wherein, in the first operating position, the first support element is moveable between the deposition line and the service position via the moving device and is carried at an axially opposite side of the at least one forming drum relative to the second support element, and, in the second operating position, the first support element is moveable between the service position and the subsequent work station clear of the second support element via the transfer device, and wherein said second support element is stably coupled with said moving device of the deposition line while the first support element is moved between the first operating position and the second operating position, wherein the carcass structure building line does not include a storage for the pair of support elements.

2. The plant according to claim 1, wherein the moving device of the deposition line comprises a holding mechanism of the second support element.

3. The plant according to claim 1, wherein the moving device of the deposition line is a shuttle.

4. The plant according to claim 1, wherein the transfer device comprises a robotized arm.

5. The plant according to claim 1, wherein the transfer device is configured to move, at said service position, the first support element from the first operating position to the second operating position.

6. The plant according to claim 1, wherein the transfer device is configured to transfer said at least one forming drum, coupled with the first support element and decoupled from the second support element, from said service position to said subsequent work station.

7. The plant according to claim 6, wherein the transfer device is configured to decouple the first support element from the forming drum.

8. The plant according to claim 7, wherein the transfer device is configured to transfer the first support element, dissociated from said at least one forming drum, from the subsequent work station to the service position.

9. The plant according to claim 1, wherein the transfer device is configured to enable, at said service position, the movement of the first support element from the second operating position to the first operating position.

10. The plant according to claim 1, wherein the subsequent work station comprises a moving device for moving said at least one forming drum within the subsequent work station.

11. The plant according to claim 10, wherein said transfer device is configured to release said at least one forming drum to the moving device of the subsequent work station, keeping the first support element coupled with the transfer device.

12. The plant according to claim 1, wherein the carcass structure building line comprises n work stations, with n being an integer at least equal to 2, at least one of which is inside the deposition line and one is the subsequent work station.

13. The plant according to claim 12, wherein the deposition line comprises m work stations, with m being an integer greater than or equal to one.

14. The plant according to claim 13, wherein the carcass structure building line comprises at most n-m forming drums.

15. The plant according to claim 1, comprising at least one crown structure building line comprising at least one work station, each crown structure comprising at least one belt structure.

16. The plant according to claim 15, comprising at least one shaping and assembly station adapted to shape the carcass structure of the tyre being processed, assembling the carcass structure to the crown structure of the tyre being processed.

17. The plant according to claim 1, wherein the pair of support elements is the only one comprised in the carcass structure building line during a steady state operation of the plant.

18. The plant according to claim 1, comprising an additional pair of support elements that replaces the pair of support elements.

* * * * *